United States Patent
David

(10) Patent No.: US 7,039,648 B2
(45) Date of Patent: May 2, 2006

(54) METHOD AND SOFTWARE SYSTEM FOR CREATING CUSTOMIZED COMPUTERIZED LIBRARIES

(75) Inventor: Tsahala David, Matan (IL)

(73) Assignee: Softlib Ltd., Jerusalem (IL)

( * ) Notice: Subject to any disclaimer, the term of this patent is extended or adjusted under 35 U.S.C. 154(b) by 263 days.

(21) Appl. No.: 10/026,896

(22) Filed: Dec. 27, 2001

(65) Prior Publication Data

US 2002/0087944 A1  Jul. 4, 2002

Related U.S. Application Data

(60) Provisional application No. 60/258,318, filed on Dec. 28, 2000.

(51) Int. Cl.
 *G06F 17/30* (2006.01)
(52) U.S. Cl. .............................. 707/102; 707/4; 707/10; 717/100
(58) Field of Classification Search .................. 707/10, 707/102, 4, 3; 717/100
See application file for complete search history.

(56) References Cited

U.S. PATENT DOCUMENTS

| | | | | |
|---|---|---|---|---|
| 5,333,312 A | * | 7/1994 | Wang | 707/10 |
| 5,761,662 A | * | 6/1998 | Dasan | 707/10 |
| 6,092,080 A | * | 7/2000 | Gustman | 707/103 R |
| 2002/0152221 A1 | * | 10/2002 | Kauffman | |

* cited by examiner

*Primary Examiner*—Greta Robinson
(74) *Attorney, Agent, or Firm*—Mark M. Friedman

(57) ABSTRACT

A system and a method for automatically generating a customized soft documentation library from a plurality of software based libraries provided by product suppliers. The library is organized in a manner pertinent to the user's requirements, according to directives of the system experts. The software-based documentation retains its original characteristic format, however a generic reader is provided that can read the formats of all documents in the library. A specialized index facility enables effective data searches. The library can be updated with additional documentation and updated versions of the documentation.

10 Claims, 2 Drawing Sheets

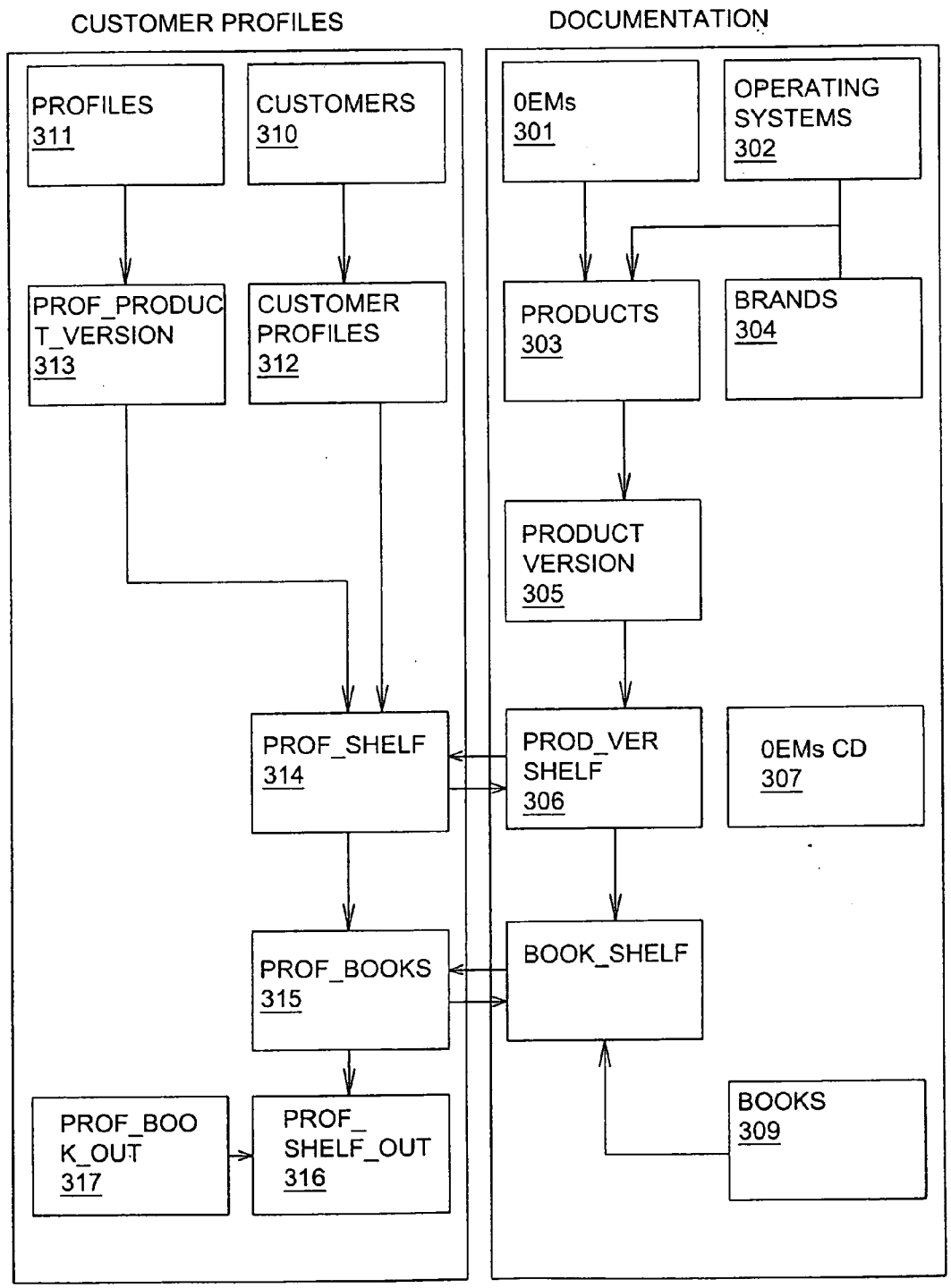
FIG. 2 DATABASE LAYOUT

METHOD AND SOFTWARE SYSTEM FOR CREATING CUSTOMIZED COMPUTERIZED LIBRARIES

CROSS REFERENCE TO RELATED APPLICATIONS

This application claims the benefit from U.S. provisional application No. 60/258,318 filed 28 Dec. 2000 by the present inventor.

FIELD AND BACKGROUND OF THE INVENTION

1. Field of the Invention

The present invention relates to a method of providing a computerized documentation library, customized according to customer requirements and, more particularly, to a method for creating an indexed library of computer based documentation from a plurality of sources in such a manner that the documentation retains its original characteristics.

2. Description of the Related Art

Many institutions maintain massive documentation libraries. For example, Engineering companies require volumes of operating documentation and systems specifications for their various engineering equipment. Large computer departments need documentation on all the hardware and software in their charge. Legal companies, insurance companies, governmental institutions and educational establishments also maintain extensive documentation libraries.

Currently, rather than maintain large libraries of books and reams of paper, documentation is provided in digital format. Digital or electronic documentation is defined as any documentation and information that is presented in a computer readable format. The computer readable documentation is then placed on computer media together with a software tool for accessing, indexing, searching and viewing the documentation. Such media includes magnetic disks, optical disks, tapes and other storage systems. Presently, the most accepted media is a Compact Disk (hereafter referred to as CD). This media is a great improvement on the paper documentation media for several reasons, including:

- CDs enable saving of great quantities of paper, and consequently are easier to store than tomes of books.
- CDs and CD based libraries are cheap to manufacture and to transport.
- Software based libraries can store massive amounts of information. A Computer Disk Read-Only Memory (CDROM) is typically able to store up to 650 Mb of data. A Digital Video Disk (DVD) is typically able to store up to 4.7 Gb (gigabytes) of data.
- A multitude of different manuals of differing types and formats can be stored on one CD.
- Software based libraries can make use of audio-visual instruction and graphic illustration.
- Software based searches are more accurate and quicker to execute than paging through physical books to find specific data.

Nevertheless, the CD method has several disadvantages, which make it so unwieldy that many companies prefer to revert back to the former paper method!

In order to illustrate the abovementioned disadvantages we can take an example of an Information Systems (IS) manager who requires to locate information in the company's CD documentation library. Large technical divisions usually receive a copious supply of CDs from their suppliers. Some CDs contain original documentation and others contain new releases and versions of previous documentation. A large technical division with many suppliers typically has a storage room full of different CDs containing documentation. When the Information Systems manager wants to research a point of documentation s/he firstly needs to search through mounds of CDs to find a relevant CD. Thereafter, the IS Manager must ensure that the CD is the latest release and version. Once the correct CD is in the IS Manager's hands, it is still problematic to find the exact documentation. Typically a supplier provides on a single CD the documentation for several related systems that s/he supports. The technical division may not even posses the majority of these systems. Often 95% of system documentation on the CD refers to systems that are irrelevant to a specific IS department's system requirements. In other words, typically the IS manager and the entire IS department that uses the documentation only require 5% of the information packed on the supplier's CD! As a result, the Information Systems manager now needs to perform another search through a quagmire of irrelevant material for the exact information required.

In many instances the relevant documentation from a single supplier may be scattered on multiple CDs, within multiple directories, arranged in different formats and intermixed with irrelevant and misleading documentation. Despite currently available search tools, the IS Manager inevitably wastes much time wading through inapplicable material in search of system specifics. Even a capable search tool may not provide exact results due to the volume of irrelevant data that it is forced to sort. Furthermore, even if the required data is available on the CD, it is often difficult to find due to the current search tools and/or poor cataloguing. Another problem is that there is no standard format for where data is located on a disk. One supplier may save documentation under the root directory. Another may choose a tree of sub-directories named and designed for various idiosyncratic reasons. In each case the IS Manager must physically search the nuances of different CDs to locate any semblance of required data.

Once the correct documentation has been located another problem arises. Often, data provided by different suppliers, and sometimes even by a single supplier on one CD, require different tools for accessing and reading purposes. For example, one supplier may write documentation in PDF format, which can only be accessed by Adobe Acrobat Reader. Another supplier may provide information in HyperText Markup Language (HTML), which requires searching with Internet browser applications such as Microsoft Explorer. Unless a compatible reader and search tool is installed on the computer where the IS Manager is working, the data that took much patience and toil to locate, is rendered inaccessible.

If this process of accessing documentation is laborious for a trained IS Manager, it is much more so for lesser skilled department members like junior programmers and Help-Desk assistants.

It is impractical for the IS Department to make a new concentrated library with documentation tailored to its specific requirements. The present means for doing so are typically manual, requiring human intervention at every stage. The computer division would need to employ a team of experts to determine requirements, to search the CDs for relevant documentation, to manually sort out of the collected documentation the required information, to check and store the results and to ensure that the correct tools for reading the different documentation are included. Only after performing the same procedure for each different set of documentation for every different supplier, could the team take the results and create a collected customized library of documentation on computer readable material. This process is ineffective and time consuming, especially on a commercial scale for large concerns.

Several systems have attempted to deal with some of these known problems.

U.S. Pat. No. 6,105,044, which is fully incorporated herein by reference, as if fully set forth herein, describes a means for taking an electronic document, formatting the document according to a style sheet and displaying the document on an output device. However, this method requires the restructuring of the original document into a new format. The document that the user ultimately reads is no longer in its former characteristic format as presented by the OEM.

U.S. Pat. No. 5,832,499, which is fully incorporated herein by reference, as if fully set forth herein, describes a Digital Library System. The system provides satisfactory cataloguing mechanisms. However this invention is aimed at interviewing Holocaust survivors and recording, categorizing and filing the interviews in such a manner that a researcher can gain access to all the data contained in the digital library. The aim of the invention is not to provide a filtered library of information, customized to the requirements of different groups of users.

Similarly U.S. Pat. No. 6,092,080, which is fully incorporated herein by reference, as if fully set forth herein, provides for a cataloguing system that can be used to perform content based searches on a central database. In addition, data that has been accessed is stored at the user's site and a local catalogue is accessed to identify data in a user request. Whereas this is a form of customizing the user's database, the customization is based only on previously accessed data. This is synonymous with a cache system in which previously accessed data is readily available, but first time access to data is unwieldy.

U.S. Pat. No. 5,860,068, which is fully incorporated herein by reference, as if fully set forth herein, describes a method and system for custom manufacture and delivery of a data product, does provide a system for creating a CD, the content of which is based on a customer's selection. However, the focus of this invention is to produce over the Internet a static CD with a limited content, generally of music, for resale. There is no means for updating the CD content when, for example, a new song is released. Further, a CD with a few songs does not require advanced indexing and searching.

U.S. Pat. No. 6,182,067, which is fully incorporated herein by reference, as if fully set forth herein, describes methods and systems for knowledge management in order to inform different users of a database system of relevant information, and to assist them in transforming the information into knowledge. The system establishes a profile representing a knowledge requirement associated with the user. Knowledge profiles are also defined by groups of concepts to be used in distinct ways. The relevance of documents is initially established by accumulated usage information based on prior usage relating to the individual documents. The list of documents is sorted by relevance and presented to the user for subjective assessment. The aim of the '067 invention is to utilize an entire database to facilitate an automated information management system.

However, the '067 invention does not provide a single compact database which takes into account all the possible requirements of users as defined by the system experts and designers. This system rather provides for the creation of a separate information bank for each user. Further, even though irrelevant material is not accorded a relevance value in each database, it is never the less included in the database.

U.S. Pat. No. 6,092,091, which is fully incorporated herein by reference, as if fully set forth herein, describes a device and method for filtering information and for monitoring updated document information. This invention most particularly operates on data on the World Wide Web (hereafter referred to as WWW) where anyone can add data in no manner of conformity. Data can be created and/or updated on the WWW without reference to the time of creation or updating. This invention provides a method of detecting changed data on the Internet, filtering the information and notifying interested users of the new or updated data. This system is therefore not a database management system of a corpus of relatively static data, but a method to search for selected pieces of dynamic information on the WWW.

There is thus a widely recognized need for, and it would be highly advantageous to have, an automated computerized system that can produce from an aggregate of documentation a digital library that only contains documentation relevant to a customer's specific set of knowledge management and information requirements.

It would be further advantageous to have a method whereby the documentation retains its original format.

It would be further advantageous to have a method that enables searching the library, such that information can be easily accessed and displayed despite varied proprietary formats.

It would be further advantageous to have a method that enables library content to be easily updated.

SUMMARY OF THE INVENTION

According to the present invention there is provided a method and system for automatically creating a digital library of documentation that is filtered and customized to customer specification.

The Soft Library Manufacturer, hereinafter referred to as "SLM", presents to the customer's technologists a questionnaire for completion. The questionnaire covers all aspects of the customer's system, documentation database and requirements. Using answers in the questionnaire, the SLM develops a preliminary list of books and shelves related to the customer. Once the customer finally amends and approves of the list, the SLM automatically creates a library including only that documentation which is relevant to the customer's specifications.

The library is provided to the customer on media such as a CD. Alternatively, the library is provided via a data network such as the Internet that only authorized users can access. The library includes an integrated index and search tool that allows the customer to search for keywords irrespective of the format or language of the document in the library. The index facility operates in a user-friendly manner, which includes shelves marked typically in different colors. The required document is then presented in its original format.

The customized library can be easily updated with latest versions of documentation and software.

The invention is not only applicable in the many fields of the computer world, which includes mainframes to client-servers and workstations, but is also applicable in general to a plurality of other applications including, science, industry and commerce. Basically, the invention can be applied wherever soft documentation is involved and accordingly customized libraries with the abovementioned features are required.

The preferred embodiment presentation of this invention, as further described, belongs to the field of mainframe computer centers. This is presented as an example and in no way limits the application of the invention in other fields and ways.

Definitions
1. Original Equipment Manufacturers (hereafter referred to as OEM) is defined to mean any manufacturer, supplier or reseller of computer related equipment and products. The OEM also makes and supplies documentation related to the equipment.
2. Soft Library refers to any collection of information stored in a computer readable format.
3. Soft Library Manufacturer (hereafter referred to as SLM) refers to the inventors of this method and software system, the licensors and any licensees who have the legal right to use the method and/or software to manufacture a Soft Library. The SLM has the means and rights for setting up, maintaining and managing the Soft Library.
4. Technologists are system management programmers, network experts and operating system doyens in charge of defining, planning, installing, maintaining and troubleshooting the Operating systems, the Databases and the Network.
5. Books refer to the individual items of documentation provided by the OEM.
6. A Shelf refers to a virtual collection of homogeneous books, categorized according to topic and/or subject matter, as determined by the SLM or by the customer. A single book may reside on several different shelves if it is categorized in several different ways.

BRIEF DESCRIPTION OF THE DRAWINGS

The principles and operation of a system for creating customized computerized libraries according to the embodiments of the present invention may be better understood with reference to the drawings and the accompanying description, it being understood that these drawings are given for illustrative purposes only and are not meant to be limiting, wherein:

FIG. 2 is an illustration of the database layout.

DESCRIPTION OF THE PREFERRED EMBODIMENT

Figure 1:
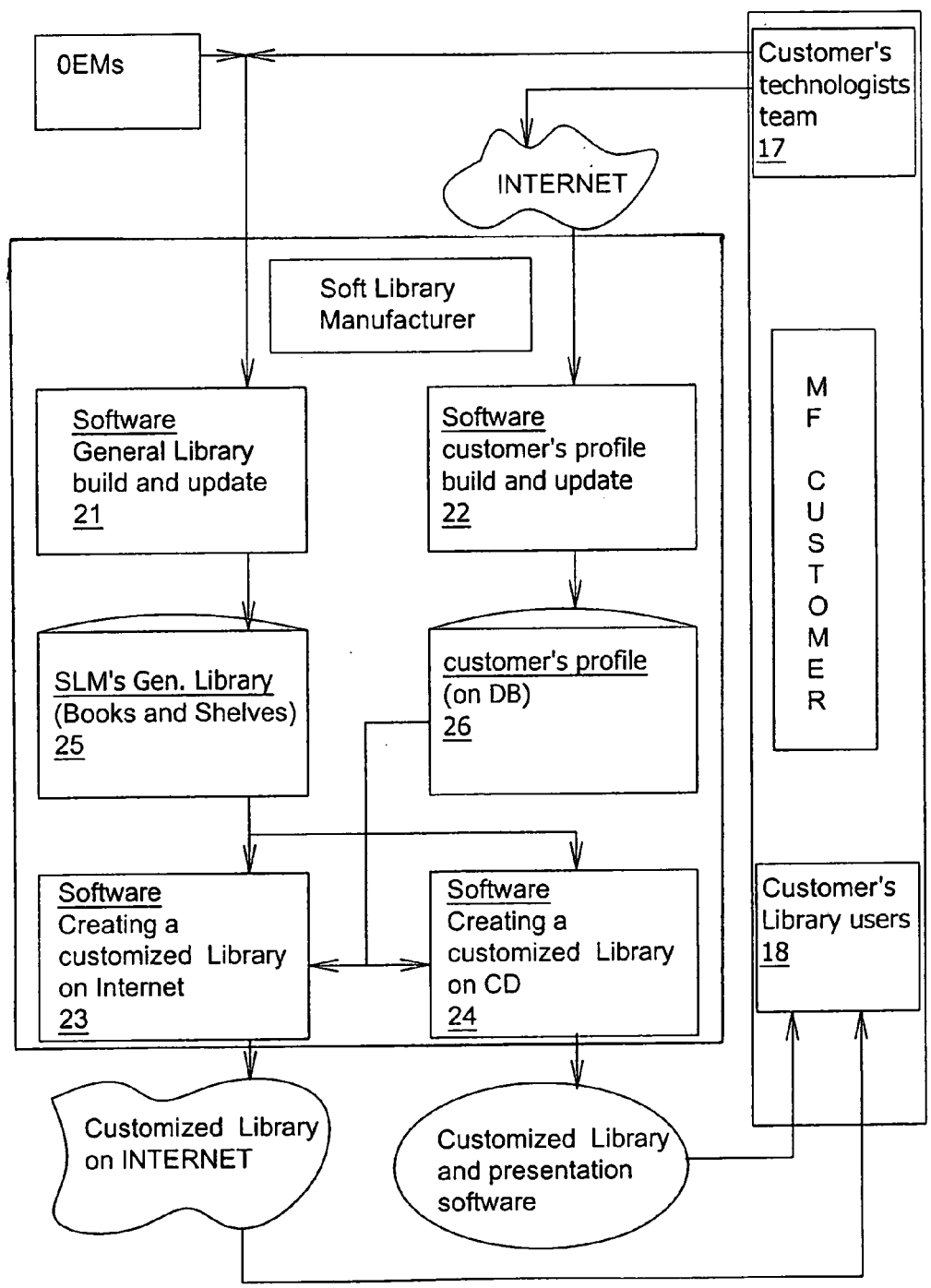
FIG. 1 is an illustration of the system and method of generating a customized library.

The present invention relates to a method and software system for generating a digital library and, more particularly, to a library of information that is extracted from a plurality of data, the resultant corpus of which is germane to a customer's specified needs and can be accessed and fine-searched in a user-friendly manner without changing the characteristics of the original data.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The preferred embodiment of the present invention, as further described, belongs to the field of mainframes (hereafter referred to as MF) and Mainframe Customers (hereafter referred to as MFC) and to the manufacture and updating of customized soft documentation libraries. This is presented as an example and in no way limits the application of the present invention in other fields and ways. It should also be noted that MFCs typically use a plurality of other systems including client-servers, NT, firewalls, proxies, routers, and so forth. Therefore, it is evident that the use of a MF is presented as an example and in no way limits the application of the present invention. The invention is similarly applicable in many fields of computers, knowledge management, science, industry and commerce, and wherever customizable libraries of soft documentation are involved.

Components:

Implementation of the present invention typically requires the trilateral participation of the Original Equipment Manufacturer (OEM), the Mainframe Customers (hereafter referred to as MFC) and the Soft Library Manufacturer (SLM). FIG. 1 illustrates the involvement of the three participants.

I. OEMs are the manufacturers and suppliers of systems to MFCs. Together with their systems the OEMs also provide corresponding relevant technical documentation. The documentation is typically a technical description of the system. There are dozens of these MF OEMs.

The documentation produced by the OEMs is typically supplied to the customers on CDs. The documentation is generally presented in several different formats and languages. The CDs, owing to their minimal cost and large capacity, typically contain all the products of that OEM. On the CD is often stored auxiliary material, for example, company promotions and advertisements. A single MF computer center usually only requires a small fraction of the information packed on all these CDs.

II. MFCs are the MF based computer centers, which belong to large organization, such as banks, communication centers, research institutes, government institutions and universities. There are tens of thousands of MFCs worldwide. Every MFC may employ hundreds of potential users of a customized library. The MF computer center personnel are typically divided in to two groups (refer to FIG. 1 reference characters 17 and 18):

1. Customer's Technologists.

Technologists are system managers and experts in charge of planning and configuring the client's system. Different technologists tend to possess specialized expertise in different fields.

2. Customer's Library users.

This includes all members of the MFC computer department who are not systems technologists. These users include help-desk personnel, technicians, operators and application programmers.

III. The SLM has the rights to the method and software system for producing a customized Soft Library.

Production of the customized Soft Library is typically based on six main components, as illustrated in FIG. 1.

i. SLM's software (21) for general library build and update.

This software is provided to organize the incoming documentation into one general conglomerate library applicable to the MFC's system. The software also performs periodical automatic updates of the library.

ii. SLM's General Library (25)—books and shelves.

The SLM General Library is the computerized library which contains the documentation of the MF software market as collected by the SLM. The library contents are typically collated from documentation provided by the OEMs and by the SLM customers. The library is periodically updated with documentation for new products, versions and releases.

iii. Software (22) for customer's profile build and update.

The profile software supports the interactive process of building the profiles for new customers and for updating the profiles of existing customers.

iv. The database of Customer Profiles (26).

This database refers to a collection of profiles that are related to the customer. Profiles are stored in a database format, typically Oracle.

v. Software (23) for creating a customized library on the Internet.

This software application supports the process of creating and presenting the restructured customized library on the SLM's Internet site and making it accessible to the related customer.

vi. Software (24) for creating a customized library on CD.

This software application supports the process of creating the restructured customized library and of storing it on CD.

Method

FIG. 1 illustrates the method of typically generating a customized soft library.

1. Building of Profile.

The SLM presents to the customer a questionnaire for completion. The customer preferably completes the questionnaire on the SLM's Internet Site. However, the questionnaire can also be forwarded to the customer by a plurality of means including fax, email and direct delivery. Particulars requested include general information about the customer, digital documentation in the customer's possession, the data and software that the customer uses and/or requires, the required library's content, lists of library users, groups of library users, the expected frequency of updates that are required and/or expected from the SLM, other terms between the SLM and the customer and the content of documentation on CDs related to the software.

The technologists are instrumental in completing the questionnaire. By means of determining parameters, defining functions and other items as required by the questionnaire, they impart of their specialized expertise to the library. As such the Soft Library is a knowledge management system.

The content of a questionnaire is customizable for different categories of customers. For example, a questionnaire provided to a MFC differs from one designed for an Engineering Equipment Manufacturer.

The questionnaire is then returned to the SLM. At this stage the terms that the customer has agreed to are forwarded to the manufacturer. The customer also provides his collection of digital documentation to the manufacturer.

The SLM transfers all the data received from the customer onto a database and an initial profile is generated. Thereafter, by means of an automatic computer software process, the SLM filters the content of the aggregate of documentation according to the customer's profile.

The process of creating a customized library is not dependent on the specific language the customer may require i.e. the entire library of books could be in English or in French or in any other language. However the documentation language must be homogeneous i.e. English and French documentation cannot be mixed in one library.

During the creation of the customized library relevant documents are copied unaltered to the customized library. This method leaves the documents preserved in their original form.

Means of performing the filtering process include:

a. Conducting an automatic search through all CDs and recording on the Manufacturer's database the names of all books and shelves.

b. Creating a preliminary list of shelves.

c. Marking the shelves that reasonably relate to the customer and filtering out of the preliminary list all unnecessary shelves.

d. Generating and thereafter transmitting to the customer a preliminary list.

The customer response includes:

a. Updating the list of books and shelves where necessary.

b. Linking shelves to technologists and/or groups of technologists whom are referred to by name. This method ensures that when the library is completed, a person searching for information in a field can relate that field to a technologist and turn to her/him for further expert assistance.

c. Transmitting the linked shelves list to SLM.

The SLM continues the process by:

a. Updating the database according to the customer's amendments.

b. Generating a new list containing names of all books according to the shelves requested by the customer. The new list is assorted in accordance to the directives of the technologists.

c. Transmitting the new list back to the customer again.

The MFC links all books on the new list to the appropriate shelves. The amended new list is then transmitted to SLM.

The SLM thereafter finalizes the customer's database and customized library by several computerized means including:

a. Updating the customer's database according to the customer's response.

b. Automatically linking all books in the library to relevant shelves and verifying the above-mentioned linking process.

2. Building of Integrated Index.

An integrated index is automatically created for all books in the customized library. The index is not limited by the plurality of formats and languages of the books.

The library is provided with a search engine that enables the user to find, by means of a single search, all books that contain requested keywords, regardless of the format of the different books. The single search can be independently performed on every single shelf, as well as on the complete library. The process does not provide a restriction regarding the quantity of books that can exist on a single shelf, nor does it place a restriction on the quantity of books or shelves in the complete library.

3. Adding a range of user-friendly features to the library including;

a. Marking shelves, for example in different colors, according to various criteria such as technologists.

b. Providing a "favorite shelf" for frequently used books.

c. Automatically linking books and shelves to corresponding technologists.

d. Providing a CUT and PASTE feature.

e. Providing built-in security features.

f. Providing an ability to print selected items.

g. Providing scrolling features.

h. Providing a marking feature to allow jumping from a position and returning to the same position.

4. Final Stage in Producing Library.

The automated software process calculates the space required by the customized library on CD. Then the software checks the validity of the linking process. Thereafter an automatic process of customized library inhabiting by required books is activated. Finally, the new-made customized library, together with presentation software, is located on CD and is transmitted to the customer. The above process of creating a customized library and presenting it on CD is illustrated in FIG. 1 item 24.

5. Internet

Additionally the software runs a process in order to present the new library on the SLM's Internet site (as shown in FIG. 1 item 23). Once the library is installed o the site, necessary rights are granted to the customer in order to access the specific Internet library.

6. Updating the Library.

In addition to the SLM being able to automatically create or update libraries, the customer can also do so on demand by invoking the appropriate software. Reasons for updating the library include:

a. Periodically amended, additional and/or new documentation is received, b. New products and/or programs are implemented on the customer's site and accordingly new documentation is supplied, and c. The customer amends and/or creates new documentation for inclusion in the customized library.

It should be noted that the library could be updated without the MFC even being aware of the process. The SLM receives from the OEM an updated version of documentation for an item in the library. Different versions of the OEM's documentation are stored in the SLM library, using a method of version numbers. The SLM merely adds the new digital documentation to the SLM library and updates the MFC's database. At predetermined intervals, the SLM creates for the MFC a new CD that includes all the updates and additional documentation provided to the SLM from the plurality of OEMs. When the MFC receives the new CD s/he may not necessarily be aware of the many updates that have occurred.

7. Self Manufacturing

The self-manufacturing module is an additional module that licensed resellers, maintenance groups and customers can purchase. The module allows them to create and update Soft Libraries by themselves without having to resort to the licensor for assistance.

The Software System

The software system, according to the present invention, provides the implementation of the method of creating digital documentation libraries, individually adapted to every customer.

The SLM software system contains two main sub-systems: database and programs.

Database

General

The database stores a collection of data such as customer profiles and customized soft library components. The soft library components include books, shelves, technologists by name, products and versions and the correlation between these components.

The database includes tables presented in FIG. 2.

Reference characters 301 to 309 refer to documentation created by

OEMs.

Reference characters 310 to 317 refer to the customer profiles ordered.

Documentation Tables

301. OEMs

This table contains data pertaining to the manufacturers of the software, including the OEM's company name and other details.

302. OPERATING_SYSTEMS

This table contains a list of existing operating systems and their codes as used by the SLM.

303. PRODUCTS

This table contains a list of all software products supplied by OEMs to the customers.

304. BRANDS

This table contains a list of categories including operating system, database, networking and security, whereby the products are classified.

305. PRODUCT_VERSION

This table contains a list of all the different versions of each product.

306. PROD_VER_SHELF

This table links the shelves to a version of a product.

307. OEM's_CDs

This table contains a list of all the CDs received from the customers and from the OEMs.

308. BOOK_SHELF

This table links every book supplied by the OEM to a shelf as supplied by the OEM.

309. BOOKS

This table includes a description of books, book titles and other information that can be used to identify various books. The table is typically used to keep track of different books in the library.

Customers Profiles Tables

310. CUSTOMERS

This table contains general data concerning all customers.

311. PROFILES

Each customer necessarily has at least one profile. The table of profiles contains a list of all profiles as ordered by various customers.

312. CUSTOMER_PROFILES

This table links the customer to his profiles.

313. PROF_PRODUCT_VERSION

This table lists all products and their versions contained in the profile.

314. PROF_SHELF

This table lists the shelves that the customer has defined as relevant to his/her library. The list of shelves is selected from table 306 (PROD_VER_SHELF).

315. PROF_BOOKS

This table lists the various books that the customer selects for his library. The selection is made from table 308 (BOOK SHELF).

316. PROF_SHELF_OUT

This table lists shelves finally defined in the customer's library.

317. PROF_BOOK_OUT

This table links every book to the shelves defined in the PROF_SHELF_OUT table.

Programs

General

The programs provide a tool for the entire automated computerized process of producing the customized libraries.

The programs for creating customized libraries are typically divided into four groups, as illustrated in FIG. 1 and described as follows in section 1 to 4. The presentation software that the customer receives together with the customized library is described as follows in section 5.

1. General Library Build and Update Software (21)

This software is typically provided to create and update the OEM's documentation tables' contents. The software is used when new documentation is received from the OEMs and/or customers. The software typically contains the following programs:

1.1 BRAND and OPERATING_SYSTEMS tables maintaining program.

The program enables creating, updating and printing of tables referring to the brands of OEM software that are defined and coded for use throughout the system.

1.2 OEM's table maintaining program.

This program enables the creation and maintaining of the OEM's table. The program is called every time a new OEM documentation is received.

1.3 PRODUCTS and PROD_VER table maintaining program.

This program enables the creation, updating and printing of the PRODUCTS and the PROD_VER tables. The program is invoked when new documentation pertaining to a new software product or to a new version of an existing product is received.

1.4 BOOKS table creation and maintaining program.

This program assigns SLM book-id's to books and updates the BOOKS table. Each individual book has a different book-id. The book-id is used as a DOS file name while storing and copying the book.

1.5 New documentation processing program.

After this program is run, the complete set of data describing every individual book and shelf of the new documentation is stored in PROD_VER_SHELF, BOOK_SHELF and BOOKS tables. This program also calls the above-mentioned programs when information dealing with a new OEM, a new product of an existing OEM or a new version of an existing product is received with the new documentation lot.

2. Customer's Profile Build and Update Software (22)

This software is provided to support the interactive process of creating a customer profile. Included in the software are the following programs:

2.1 PROFILE and CUSTOMERS table creating and maintaining program.

This program is called to add a new entry to the CUSTOMER table, to the PROFILE table and to the CUST_PROF table for every new customer.

2.2 PROF_PRODUCT_VERSION table creating and maintaining program.

This program is called every time a new customer chooses a specific version of a product. The program adds the chosen product and its version to the PROF_PRODUCT_VERSION table. Every new product added to the profile, or change of version of an existing product triggers the PROF_SHELF and PROF_BOOKS tables creating program, in order to choose the required shelves and books (see paragraphs 2.3. and 2.4. following).

2.3 PROF_SHELF table creating and maintaining program.

This program is called automatically every time the customer performs a change in the PROF_PRODUCT_VERSION table. The customer can also invoke the program in order to change the content of the shelves list.

2.4 PROF_BOOKS table creating and maintaining program.

This program is called every time a change is made in the PROF_SHELF table.

The program presents all the books from the BOOK_SHELF table for each PROF_SHELF existing in the customer's profile. Every book the customer selects is included in the PROF_BOOKS table for that customer. Every book deselected by the customer is deleted from the PROF_BOOKS table. In the case where this is the only reference to that book in the profile of the customer, the book is also deleted from the PROF_BOOK_OUT table.

2.5 PROF_SHELF_OUT table creating and maintaining program.

Customers invoke this program in order to change the default layout of their library. The program presents the customer with a list of existing shelves previously defined in the PROF_SHELF_OUT table by the SLM or by the customer and with a space to define the new shelves to be added. When a customer deletes a shelf, the corresponding entry in PROF_SHELF_OUT table is correspondingly deleted and similarly all corresponding entries in the PROF_BOOK_OUT table are deleted.

3. Software for Creating a Customized Library on the Internet (23)

This software is used to create the integrated index and the SHELF files needed to access the customized library on Internet. Included in the software are the following programs:

3.1 Program for building an INTEGRATED INDEX for a shelf.

This program gets the entry in PROF_SHELF_OUT table as a parameter. For every book on the shelf the books index is read and merged with the index entries of other books. This creates a combined index for that shelf. The volume of the index is estimated and stored in the PROF_SHELF_OUT entry for that shelf.

3.2 Program for building the SHELVES and INDEXES for the customer's libraries.

The program gets the CUST_PROF table entry as a parameter. For every PROF_SHELF_OUT that exists for a specific profile the relevant program for building an integrated index (see paragraph 3.1 above) is invoked in order to build a shelf file using the data from the PROF_BOOKS_OUT table. The total volume of the files and the index is calculated and stored in the PROF_SHELF_OUT entry.

The library is ready to be accessed on the Internet as soon as the new indexes and shelves are built. The same shelves and indexes are also copied to the libraries on customer CDs.

4. Software for Creating a Customized Library on CD (24)

Along with the ability to access their customized library on Internet, the customers are provided with their customized library on CD. This enables them to install the library typically on a Local Area Network. The software, supporting the process of creating customized library on CD, includes the following programs:

4.1 PROF_CDs table creating and maintaining program

The program gets an entry in the CUST_PROF table as a parameter. The program then estimates the combined volume of all books, all shelves, and all indexes included in that profile.

4.2 Program for building a CD

The program receives the entry in CUSTOMERS table as a parameter. Using that parameter it copies all books, shelves and indexes according to the CUST_PROF, PROF_SHELF_OUT, PROF_BOOKS or PROF_CD's tables to the final customized library. Then it copies the libraries on a CD, which in turn is sent to the customer.

5. Presentation Software 5.1 General

The only presentation software provided to the customer with the library is the CUSTOMIZED LIBRARY MANAGER program. When a required document is opened this program discerns the format of the digital document and evokes the corresponding presentation program to display the document in its original format. Corresponding presentation software could be IBM Book Manager Reader, Adobe Acrobat Reader and various other readers.

The CUSTOMIZED LIBRARY_MANAGER program provides the customer with ability to use the library on the Internet or an Intranet, on Windows standalone workstations and/or on the LAN.

5.2 Functionality

The program includes two separate functions:

a. The program displays for the end user's perusal a list of shelves containing books of different formats. When the user chooses a shelf the list of books contained on the shelf is displayed. When the user chooses a book from the shelf the program invokes the appropriate reader to display the contents of the book.

b. The program performs a full text search. When the SEARCH option is selected a drop down dialog box is displayed enabling the user to enter in the keywords being searched for. The program consults the integrated index and in turn displays a list of books containing the keywords. When the user chooses a book from the list the correct reader pertaining to the format of the book format is invoked.

Alternate Embodiments

Several other embodiments are contemplated by the inventors. Even though for purposes of explanation the example of a MFC was used above, the method and software is not limited to computer systems. Another example where this customized Soft Library could be utilized is in the engineering environment. Let us take for example an engineering company that maintains and re-distributes fans. The engineering company receives fans from suppliers and manufacturers, from all over the world. The fans differ in size, from household kitchen expulsion fans to gigantic industrial fans used to ventilate mine chambers many kilometers under ground. Generally provided with each fan is a set of electronic documentation on CD. A large Engineering company typically has hundreds of un-catalogued and disorganized CDs. This makes finding documentation for purposes like promotions, marketing, manufacture and maintenance an ordeal. Such an Engineering company would benefit by a customized computerized library as described above.

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A method for creating a customized soft library for an organization from a plurality of digital documents, the method comprising the steps of:
   (a) creating at least one user profile for the organization, based on at least one user preference, by presenting to a user within the organization a questionnaire for completion, and receiving said questionnaire subsequent to completion by said user;
   (b) receiving from the organization the digital documents; and
   (c) conducting an automatic search through the digital documents, thereby creating the customized soft library by indexing the digital documents with an integrated index based on said at least one user preference, whereby the digital documents are filtered based on said at least one user preference; and
   (d) storing the customized soft library on at least one computer medium.

2. The method of claim 1, wherein the customized soft library is provided to the organization via a data network.

3. The method of claim 1, wherein each of the digital documents is in an original format, and wherein a corresponding document contained in the customized soft library retains said original format.

4. The method of claim 1, wherein the digital documents further include at least one additional digital document from a software library manufacturer.

5. The method of claim 1, wherein said indexing includes classifying the digital documents into shelves and books as specified by the user in said questionnaire.

6. The method of claim 1, wherein said user profile includes keywords specified by the user in said questionnaire and said indexing includes assigning keywords to the digital documents, the method further comprising the step of:
   (e) searching the customized soft library for said keywords for locating a required document.

7. The method of claim 1, wherein said receiving includes receiving the digital documents as a collection of optical disks.

8. A software system which creates a customized soft library for an organization from a plurality of digital documents, the system comprising:
   (a) a user profile build and update module which creates and updates at least one user profile for the organization based on at least one user preference, by presenting a user within the organization a questionnaire for completion, and receiving said questionnaire subsequent to completion by the user;
   (b) a library build and update module which receives from the organization the digital documents and indexes the digital documents with an integrated index according to said at least one user profile, thereby creating the customized soft library.

9. The system of claim 8, wherein each of the digital documents is in an original format, and wherein a corresponding document contained in the customized soft library retains said original format.

10. A method for creating a customized soft library for an organization from a plurality of digital documents, the method comprising the steps of:
   (a) creating at least one user profile for the organization, based on at least one user preference, by presenting to a user within the organization a questionnaire for completion, and receiving said questionnaire subsequent to completion by said user;
   (b) receiving from the organization the digital documents;
   (c) conducting an automatic search through the digital documents, thereby creating the customized soft library by indexing the digital documents with an integrated index based on said at least one user preference, whereby the digital documents are filtered based on said at least one user preference; and
   (d) storing the customized soft library on at least one computer medium, wherein each of the digital documents is in an original format, and wherein a corresponding document contained in the customized soft library retains said original format.

* * * * *